United States Patent
Longman et al.

(10) Patent No.: US 11,587,214 B2
(45) Date of Patent: Feb. 21, 2023

(54) MULTIPATH GHOST MITIGATION IN VEHICLE RADAR SYSTEM

(71) Applicant: GM Global Technology Operations LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 677 days.

(21) Appl. No.: 16/593,359

(22) Filed: Oct. 4, 2019

(65) Prior Publication Data
US 2021/0104027 A1    Apr. 8, 2021

(51) Int. Cl.
*G06T 5/50*    (2006.01)
*G06T 5/00*    (2006.01)
*G01S 17/08*   (2006.01)

(52) U.S. Cl.
CPC ............... *G06T 5/50* (2013.01); *G01S 17/08* (2013.01); *G06T 5/001* (2013.01); *G06T 5/009* (2013.01)

(58) Field of Classification Search
CPC ..................................................... G06T 5/50
See application file for complete search history.

(56) References Cited

U.S. PATENT DOCUMENTS

2018/0120842 A1* 5/2018 Smith ............... G01S 7/412

OTHER PUBLICATIONS

G. Gennarelli and F. Soldovieri, "Multipath Ghosts in Radar Imaging: Physical Insight and Mitigation Strategies," in IEEE Journal of Selected Topics in Applied Earth Observations and Remote Sensing, vol. 8, No. 3, pp. 1078-1086, Mar. 2015, doi: 10.1109/JSTARS.2014.2363233. (Year: 2015).*

O. Longman, S. Villeval and I. Bilik, "Multipath Ghost Targets Mitigation in Automotive Environments," 2021 IEEE Radar Conference (RadarConf21), 2021, pp. 1-5, doi: 10.1109/RadarConf2147009.2021.9455253. (Year: 2021).*

* cited by examiner

*Primary Examiner* — Shivang I Patel
(74) *Attorney, Agent, or Firm* — Cantor Colburn LLP

(57) ABSTRACT

Systems and methods involve detecting objects using a radar system of a vehicle. Tracks of the objects are initiated in a track database. The tracks store data, respectively, for the objects and are updated based on additional detections of the objects. The tracks of the objects are initially unclassified tracks. Two tracks corresponding to two of the objects are selected as a candidate pair. Criteria are applied to the candidate pair to determine whether one track is of a ghost object and another track is of a true object corresponding with the ghost object. The ghost object represents detection of the true object in an incorrect location. The candidate pair is classified as tracks of a true object and ghost object pair based on determining that the one track is of the ghost object and the other track is of the true object corresponding with the ghost object.

20 Claims, 5 Drawing Sheets

MULTIPATH GHOST MITIGATION IN VEHICLE RADAR SYSTEM

INTRODUCTION

The subject disclosure relates to multipath ghost mitigation in a vehicle radar system.

A vehicle (e.g., automobile, motorcycle, truck, construction equipment, farm equipment, automated factory equipment) may include sensors to obtain information about the vehicle and its environment. Exemplary sensors include radio detection and ranging (radar) systems, light detection and ranging (lidar) systems, and cameras. Certain scenarios may lead to inaccurate information from a sensor. In the case of a radar system, transmitted energy is reflected by an object in the field of view of the radar system. The resulting reflected energy is received by the radar system and analyzed to determine information about the object such as its relative location to the radar system. When transmitted energy is deflected by one object to a second object, the reflected energy received from the second object is referred to as a multipath reflection and the second object is detected as a ghost object (i.e., a wrong location is perceived). Accordingly, it is desirable to provide multipath ghost mitigation in a vehicle radar system.

SUMMARY

In one exemplary embodiment, a method for a radar system of a vehicle includes detecting two or more objects using the radar system of the vehicle. Tracks of the two or more objects in a track database are initiated. The tracks store data, respectively, for the two or more objects and are updated based on additional detections of the two or more objects. The tracks of the two or more objects initially are unclassified tracks in the track database. Two tracks corresponding to two of the two or more objects from the track database are selected as a candidate pair. Criteria are applied to the candidate pair to determine whether one track of the two tracks of the candidate pair is a track of a ghost object resulting from multipath reflection and another track of the two tracks of the candidate pair is a track of a true object corresponding with the ghost object. The ghost object represents detection of the true object in an incorrect location. The candidate pair is classified in the track database as tracks of a true object and ghost object pair based on determining that the one track of the two tracks of the candidate pair is the track of the ghost object and the other track of the two tracks of the candidate pair is the track of the true object corresponding with the ghost object. Information from the track database is reported and, based on the classifying, only the data for the track of the true object is reported. The information is used to control an operation of the vehicle.

In addition to one or more of the features described herein, the selecting the two tracks of the candidate pair is based on a difference between a first range obtained from the one track of the two tracks of the candidate pair and a second range obtained from the other track of the two tracks of the candidate pair being within a threshold range value.

In addition to one or more of the features described herein, the method also includes iteratively selecting different candidate pairs from the track database, applying the criteria, and classifying the different candidate pairs.

In addition to one or more of the features described herein, the method also includes classifying one or both of the two tracks of the candidate pair as the track of the true object or leaving a prior classification of the two tracks of the candidate pair based on the criteria not determining that the one track of the two tracks of the candidate pair is the track of the ghost object and the other track of the two tracks of the candidate pair is the track of the true object corresponding with the ghost object.

In addition to one or more of the features described herein, the applying the criteria to the candidate pair includes applying a first criterion that includes estimating a shape of a reflective surface giving rise to the multipath reflection that would result in the one track of the two tracks of the candidate pair being the track of the ghost object.

In addition to one or more of the features described herein, the applying the first criterion includes determining that the one track of the two tracks of the candidate pair is the track of the ghost object based on a linearity of the reflective surface.

In addition to one or more of the features described herein, the applying the criteria to the candidate pair includes applying a second criterion that includes determining if dynamics indicated by the one track of the two tracks of the candidate pair matches dynamics indicated by the other track of the two tracks of the candidate pair such that velocity and heading indicated by the two tracks of the candidate pair are correlated within a threshold amount over multiple updates of the two tracks.

In addition to one or more of the features described herein, the applying the second criterion includes determining a first velocity indicated by the other track of the two tracks of the candidate pair using the one track of the two tracks of the candidate pair, determining a second velocity indicated by the other track of the two tracks of the candidate pair using the updates of the other track of the two tracks of the candidate pair, and classifying the one track of the two tracks of the candidate pair as the track of the ghost object and the other track of the two tracks of the candidate pair as the track of the true object corresponding with the ghost object based on the first velocity and the second velocity being within a specified threshold of each other.

In addition to one or more of the features described herein, the applying the criteria to the candidate pair includes determining an incident angle of transmit energy from the radar system on a reflective surface that gives rise to the multipath reflection that would result in the one track of the two tracks of the candidate pair being the track of the ghost object and determining whether the incident angle is below a threshold value, the threshold value being range-dependent.

In addition to one or more of the features described herein, the method also includes estimating a velocity of the true object based on the ghost object based on the determining that the one track of the two tracks of the candidate pair is the track of the ghost object and the other track of the two tracks of the candidate pair is the track of the true object corresponding with the ghost object.

In another exemplary embodiment, a system in a vehicle includes a radar system to detect two or more objects. The system also includes a processor to initiate tracks of the two or more objects in a track database, the tracks storing data, respectively, for the two or more objects and being updated based on additional detections of the two or more objects, and the tracks of the two or more objects initially being unclassified tracks in the track database. The processor additionally selects two tracks corresponding to two of the two or more objects from the track database as a candidate pair, and applies criteria to the candidate pair to determine whether one track of the two tracks of the candidate pair is a track of a ghost object resulting from multipath reflection and another track of the two tracks of the candidate pair is a track of a true object corresponding with the ghost object. The ghost object represents detection of the true object in an incorrect location. The processor additionally classifies the candidate pair as tracks of a true object and ghost object pair based on determining that the one track of the two tracks of the candidate pair is the track of the ghost object and the other track of the two tracks of the candidate pair is the track of the true object corresponding with the ghost object. The processor reports information from the track database. The report provides the data only for the track of the true object, not the ghost object. The information is used to control an operation of the vehicle.

In addition to one or more of the features described herein, the processor selects the two tracks of the candidate pair based on a difference between a first range obtained from the one track of the two tracks of the candidate pair and a second range obtained from to the other track of the two tracks of the candidate pair being within a threshold range value.

In addition to one or more of the features described herein, the processor iteratively selects different candidate pairs from the track database, applies the criteria, and classifies the different candidate pairs.

In addition to one or more of the features described herein, the processor classifies one or both of the two tracks of the candidate pair as the track of the true object or leave prior classification of the two tracks of the candidate pair based on the criteria not determining that the one track of the two tracks of the candidate pair is the track of the ghost object and the other track of the two tracks of the candidate pair is the track of the true object corresponding with the ghost object.

In addition to one or more of the features described herein, the processor applies the criteria by applying a first criterion that includes estimating a shape of a reflective surface giving rise to the multipath reflection that would result in the one track of the two tracks of the candidate pair being the track of the ghost object.

In addition to one or more of the features described herein, the processor applies the first criterion to determine that the one track of the two tracks of the candidate pair is the track of the ghost object based on a linearity of the reflective surface.

In addition to one or more of the features described herein, the processor applies the criteria by applying a second criterion that includes determining if dynamics of the one track of the two tracks of the candidate pair matches dynamics of the other track of the two tracks of the candidate pair such that velocity and heading indicated by the two tracks of the candidate pair are correlated within a threshold amount over multiple updates of the two tracks.

In addition to one or more of the features described herein, the processor applies the second criterion to determine a first velocity indicated by the other track of the two tracks of the candidate pair using the one track of the two tracks of the candidate pair, determines a second velocity of the other track of the two tracks of the candidate pair using the updates of the other track of the two tracks of the candidate pair, and classifies the one track of the two tracks of the candidate pair as the track of the ghost object and the other track of the two tracks of the candidate pair as the track of the true object corresponding with the ghost object based on the first velocity and the second velocity being within a specified threshold of each other.

In addition to one or more of the features described herein, the processor applies the criteria to the candidate pair to determine an incident angle of transmit energy from the radar system on a reflective surface that gives rise to the multipath reflection that would result in the one track of the two tracks of the candidate pair being the track of the ghost object and to determine whether the incident angle is below a threshold value, the threshold value being range-dependent.

In addition to one or more of the features described herein, the processor estimates a velocity of the true object based on the ghost object based on the classifying indicating that the one track of the two tracks of the candidate pair is the track of the ghost object and the other track of the two tracks of the candidate pair is the track of the true object corresponding with the ghost object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
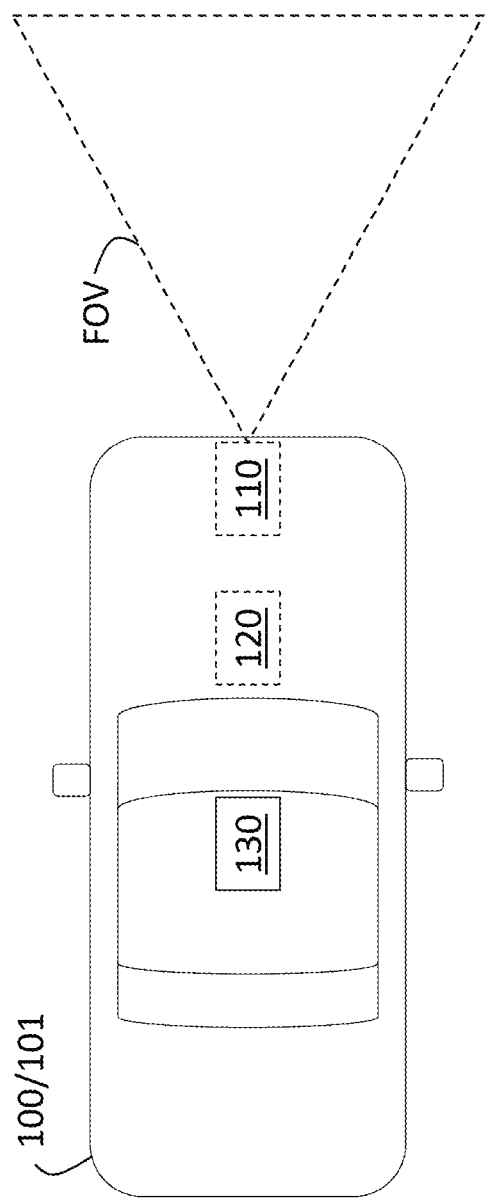
FIG. 1 is a block diagram of a vehicle in which multipath ghost mitigation is implemented according to one or more embodiments.

The following description is merely exemplary in nature and is not intended to limit the present disclosure, its application or uses. It should be understood that throughout the drawings, corresponding reference numerals indicate like or corresponding parts and features.

As previously noted, deflection (rather than reflection) of transmitted energy can result in a multipath reflection. That is, for example, the energy may traverse multiple paths to travel from the radar system to a first object that deflects the transmitted energy, to a second object that reflects the deflected energy back to the radar system via the first object. By contrast, a direct reflection results from transmitted energy being reflected back to the radar system by the first object that is encountered. In the case of multipath reflection, the position of the second object will appear to be in a different place than the actual position of the second object (i.e., as a ghost object). Essentially, the ghost object will appear as a mirror image of the second object with the first object acting as the mirror surface.

In vehicle applications, roads, guardrails, buildings, and other surfaces may increase the likelihood of multipath reflections. At the same time, ghost objects may create challenges in vehicle radar systems because information from a radar system may be used to control autonomous or semi-autonomous operation of the vehicle. The detection of a ghost object may result in unnecessary automatic braking or other unwarranted operation of the vehicle. In prior radar systems, an approach to dealing with multipath reflections involved identifying ghost objects. However, this approach considered each detected object individually. Embodiments of the systems and methods detailed herein relate to multipath ghost mitigation in a vehicle radar system based on correlating ghost objects with real objects and tracking both. That is, ghost objects are identified based on considering a pair of detected objects at a time. Correlation metrics are used to identify ghost objects and the true objects to which they correspond. Ghost objects are then tracked along with their true counterparts. Tracking ghost objects avoids re-identifying the same ghost object multiple times. According to embodiments herein, because a ghost object and true object pair are correlated, the velocity of a true object may be more accurately estimated by using the Doppler of its corresponding ghost object.

In accordance with an exemplary embodiment, FIG. 1 is a block diagram of a vehicle 100 in which multipath ghost mitigation is implemented. The exemplary vehicle 100 in FIG. 1 is an automobile 101. The vehicle 100 includes a radar system 110 with an exemplary field of view (FOV), as indicated. The vehicle 100 may additionally include other sensors 130 (lidar system, camera) that may be located anywhere within or on the vehicle 100. A controller 120 obtains data or information from the radar system 110 and other sensors 130 and may control one or more operations of the vehicle 100. Specifically, the multipath ghost mitigation detailed herein may be implemented by the controller 120, the radar system 110, or a combination of the two. A processor of the radar system 110 and the controller 120 include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
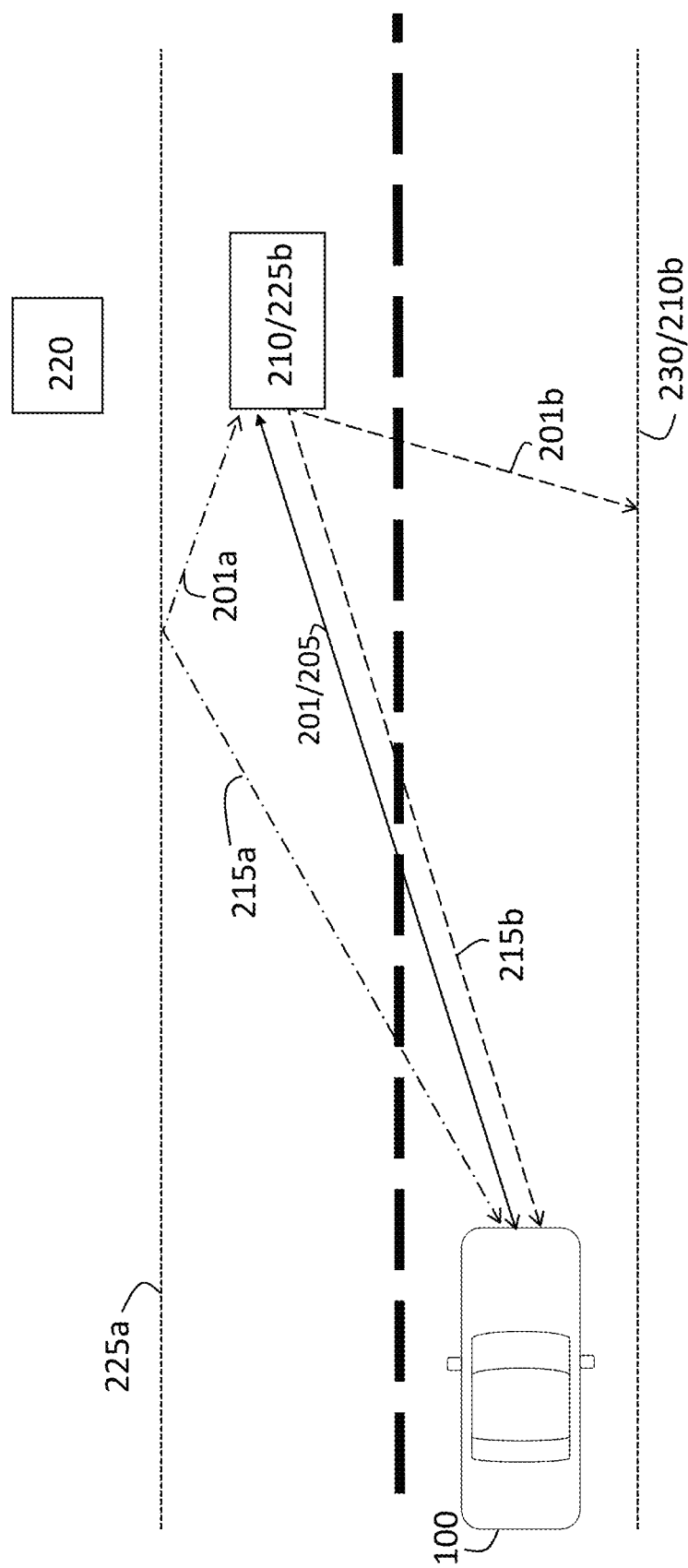
FIG. 2 illustrates exemplary scenarios giving rise to multipath ghost mitigation for a vehicle according to one or more embodiments.

FIG. 2 illustrates exemplary scenarios giving rise to multipath ghost mitigation for a vehicle 100 according to one or more embodiments. One exemplary true object 210 in FIG. 2 may be another car in an adjacent lane to the vehicle 100. A direct reflection 205 and two multipath reflections 215a, 215b (generally referred to as 215) are shown for explanatory purposes to illustrate exemplary ways that multipath reflections 215 may be generated. The direct reflection 205 refers to transmitted energy 201 from the vehicle 100 being directed to the true object 210, which then reflects that transmitted energy 201 back as a direct reflection 205. The multipath reflection 215a results from transmitted energy 201a being deflected by a reflective surface 225a to the true object 210. The transmitted energy 201 and the multipath reflection 215a traverse the same path in reverse of each other with the reflective surface 225a intervening in the path taken by both the transmitted energy 201 and the multipath reflection 215a. The deflected transmitted energy 201a reflects from the true object 210 as multipath reflection 215a. The multipath reflection 215b results from transmitted energy 201b being deflected by the true object 210, which acts as a reflective surface 225b in this case, to a guardrail 230, which acts as a true object 210b in this case. The deflected transmitted energy 201b reflects from the true object 210b (i.e., guardrail 230) as multipath reflection 215b. The reflective surfaces 225a, 225b (generally referred to as 225) may be guardrails, buildings, the road surface, or vehicles on the road, for example. As previously noted, a multipath reflection 215 may appear as a ghost object 220. This is illustrated for multipath reflection 215a in FIG. 2. As noted, the ghost object 220 may appear as a mirror image of the true object 210 with the reflective surface 225a acting as the mirror surface.

Processing of the reflections (direct reflections 205 and multipath reflections 215) received by a radar system 110 (FIG. 1) of the vehicle 100 includes an analog-to-digital conversion followed by two fast Fourier transforms (FFTs). The first FFT results in an indication of the energy level at each of the detected ranges, and the second FFT results in an indication of energy level for each relative velocity value. Beamforming is a process that indicates the energy associated with each relative azimuth angle in the FOV. A detector applies a threshold to the energy levels to identify detections (i.e., potential true objects 210) and to determine the range, Doppler (relative velocity), and angle to each. After detections are identified, clustering and tracking may be performed. That is, when two or more detections of the same object are obtained, the information (e.g., range, Doppler) along with predictions relating to movement of the object are used to generate a track of the object. This track is updated with each new detection and subsequent update of prediction for the object. Embodiments detailed herein relate to classifying tracks as corresponding to a true object 210 or a ghost object 220. Further, because tracks are considered as pairs, the identification of a track of a ghost object 220 includes the identification of a track of the corresponding true object 210.

Tracks of ghost objects 220 are not reported for use in controlling vehicle systems in the way that tracks of true objects 210 are. However, as previously noted, the tracking of ghost objects 220 may result in efficiencies and advantages. The classification of the tracks of ghost objects 220 is detailed with reference to FIG. 3. The classification is based on correlating the track of each ghost object 220 with the track of its corresponding true object 210. For any given potential true object 210 and ghost object 220 pair, the ghost object 220 will have a longer range than the true object 210 due to the multipath rather than direct propagation of transmitted energy 201. At the same time, the difference in range to the true object 210 and the ghost object 220 will not be above some threshold value. These and other criteria are used, as detailed with reference to FIG. 3, to identify a true object 210 and ghost object 220 pair in the track database 305.

Figure 3:
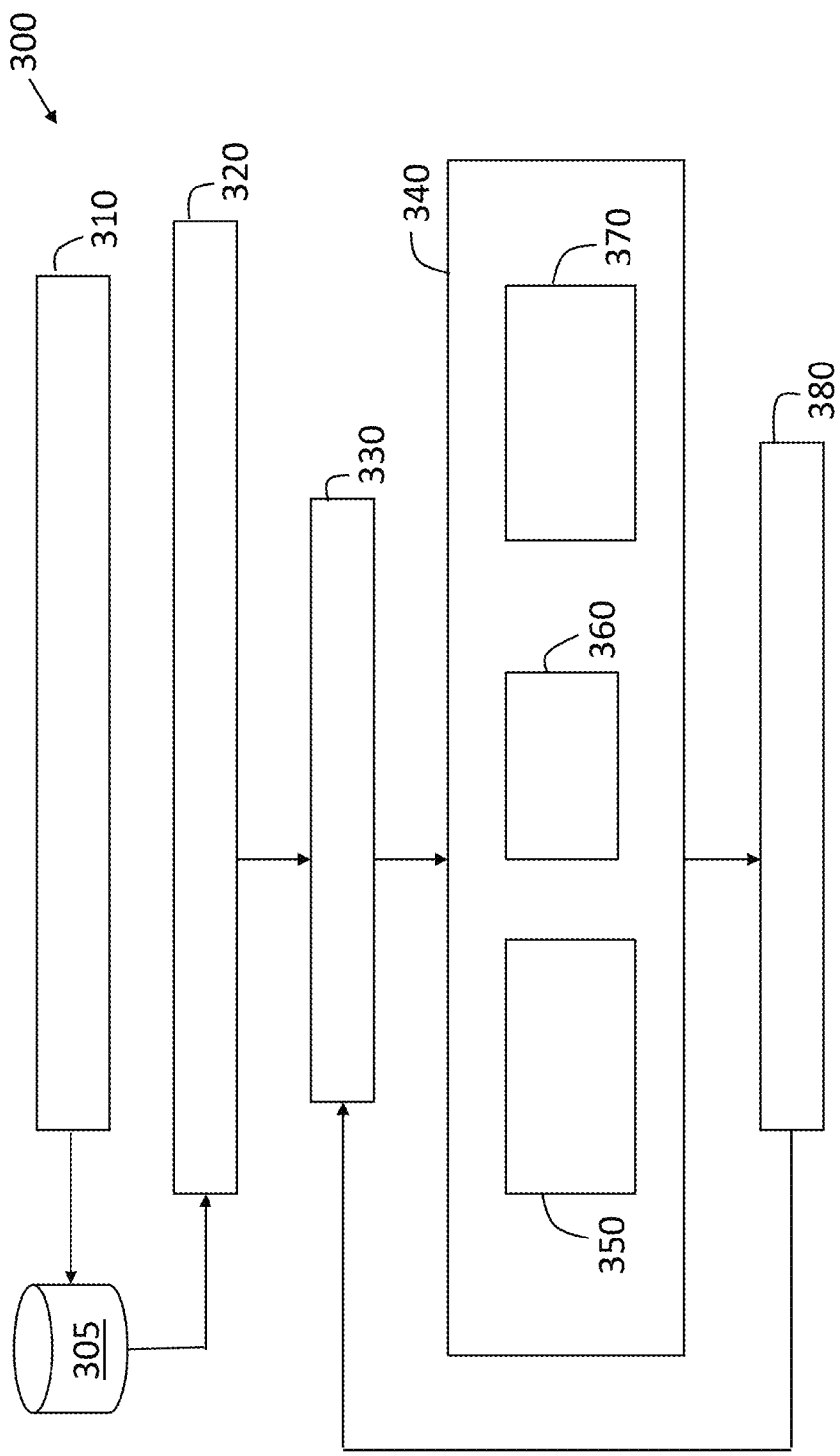
FIG. 3 is a process flow of a method of performing multipath ghost mitigation in a vehicle radar system according to one or more embodiments.

FIG. 3 is a process flow of a method 300 of performing multipath ghost mitigation in a vehicle radar system 110 according to one or more embodiments. Specifically, the processes are used to classify each track of an object in the track database 305 as a track of a true object 210 or a track of a ghost object 220. Further, each track of a ghost object 220 is correlated with a track of the true object 210 that gave rise to the ghost object 220. Based on this classification, only information from the tracks of true objects 210 is reported for use by the controller 120 in controlling operation of the vehicle 100. At block 310, detecting objects 210, 220, as previously described using FFT and beamforming, and processing (e.g., performing prediction) to add to the track database 305 refers to either starting a new track of an object or updating an existing track of an object in the track database 305. A track in the track database 305 is initially unclassified (i.e., there is no indication of whether the track corresponds with a true object 210 or a ghost object 220). Thus, the processes at blocks 320-380 are used to classify unclassified tracks (i.e., tracks of objects that are not classified as true objects 210 or ghost objects 220) in the track database 305 as tracks of true objects 210 or ghost objects 220.

At block 320, the method 300 includes determining candidate pairs among the unclassified tracks in the track database 305. This process involves sorting the unclassified tracks in the track database 305 by range. As previously noted, for a true object 210 and its corresponding ghost object 220, the range to the ghost object 220 will be longer than the range to the true object 210. In addition, the ranges to the ghost object 220 and to the true object 210 will not be too different (i.e., difference will be less than a threshold value). Thus, based on the range (or set of ranges in the case of a track of a moving object) stored for a given unclassified track in the track database 305, a track of a candidate ghost object 220 or a track of a candidate correlated true object 210 may be identified to form the candidate pair. The track of the candidate ghost object 220 will have a stored range (or ranges) that is longer than the stored range (or ranges) for the given unclassified track. The track of the candidate correlated true object 210 will have a stored range (or ranges) that is shorter than the stored range (or ranges) for the given unclassified track. In addition, the track of the candidate correlated true object 210 may already be classified as a track of a true object 210 (in a previous iteration). In that case, the processes at blocks 330 and 340 will determine if the true object 210 gives rise to the ghost object 220 corresponding with the given unclassified track. Based on the process at block 320 that involves the ranges at which unclassified tracks were detected, every candidate pair that is currently in the track database 305 may be identified. When additional objects are detected and processed to be added to the track database 305 as new tracks (at block 310), the method 300 may be repeated to address new unclassified tracks in the track database 305.

At block 330, selecting a candidate pair refers to choosing one of the candidate pairs identified at block 320. The selected candidate pair includes two tracks, at least one of which is an unclassified track. As previously noted, a candidate pair may include a track that is already classified as the track of a true object 210. In this case, the classification of the candidate pair according to the processes determines if the true object 210 whose track is part of the candidate pair gives rise to the ghost object 220 whose track is the unclassified track in the candidate pair. At block 340, applying criteria involves three processes. The first of the three processes at block 340 involves determining the shape of the reflective surface 225, at block 350. This is because a reflective surface 225 that gives rise to multipath reflections 215 is typically linear. The second criteria applied at block 340 includes determining whether dynamics (e.g., location, velocity) of the tracks of the candidate pair correlate with each other, at block 360. This is because a true object 210 and ghost object 220 will typically have matching dynamics. The third criteria applied at block 340 includes determining the incident angle of the transmitted energy 201 on the reflective surface 225 that would have given rise to the candidate ghost object 220, at block 370. This is because multipath reflections 215 typically occur based on low incident angles. Each of these criteria used at block 340 is further discussed.

At block 380, classifying according to the criteria refers to different potential outcomes. Based on the criteria applied at block 340, the candidate pair, selected at block 330, may be classified as tracks of a ghost object 220 and the true object 210 that gives rise to that ghost object 220 (i.e., a true object 210 and ghost object 220 pair). However, if, based on the criteria applied at block 340, the candidate pair is deemed not to be tracks of a true object 210 and ghost object 220 pair, then the tracks of the candidate pair may either retain their prior status or one or both tracks may be classified as a track of a true object 210, as detailed. A track that is part of the candidate pair but is either not part of any other candidate pair or is not the track of a candidate ghost object 220 in another candidate pair (determined at block 320) may be classified as the track of a true object 210. If the candidate pair included a track of a candidate ghost object 220 and a track of a candidate correlated true object 210, with the track of the candidate correlated true object 210 already being classified as the track of a true object 210, then, even if the criteria of a true object 210 and ghost object 220 pair is not met (at block 380), then the true object 210 classification is retained.

According to an exemplary embodiment, all three of the criteria that are checked at block 340 must indicate that the candidate pair is a true object 210 and ghost object 220 pair in order for the candidate pair to be so declared. This is because, on balance, it may be deemed better to not missclassify a true object 210 as a ghost object 220. According to alternate embodiments, minimizing false alarms and braking or other actions may be deemed more important. In that case, a candidate pair may be declared as a true object 210 and a ghost object 220 based on only one or two of the three criteria at block 340. As indicated in FIG. 3, once a candidate pair (selected at block 330) has been examined, another candidate pair is selected for the next iteration. The iterations continue until all the candidate pairs identified at block 320 have been processed.

Figure 4:
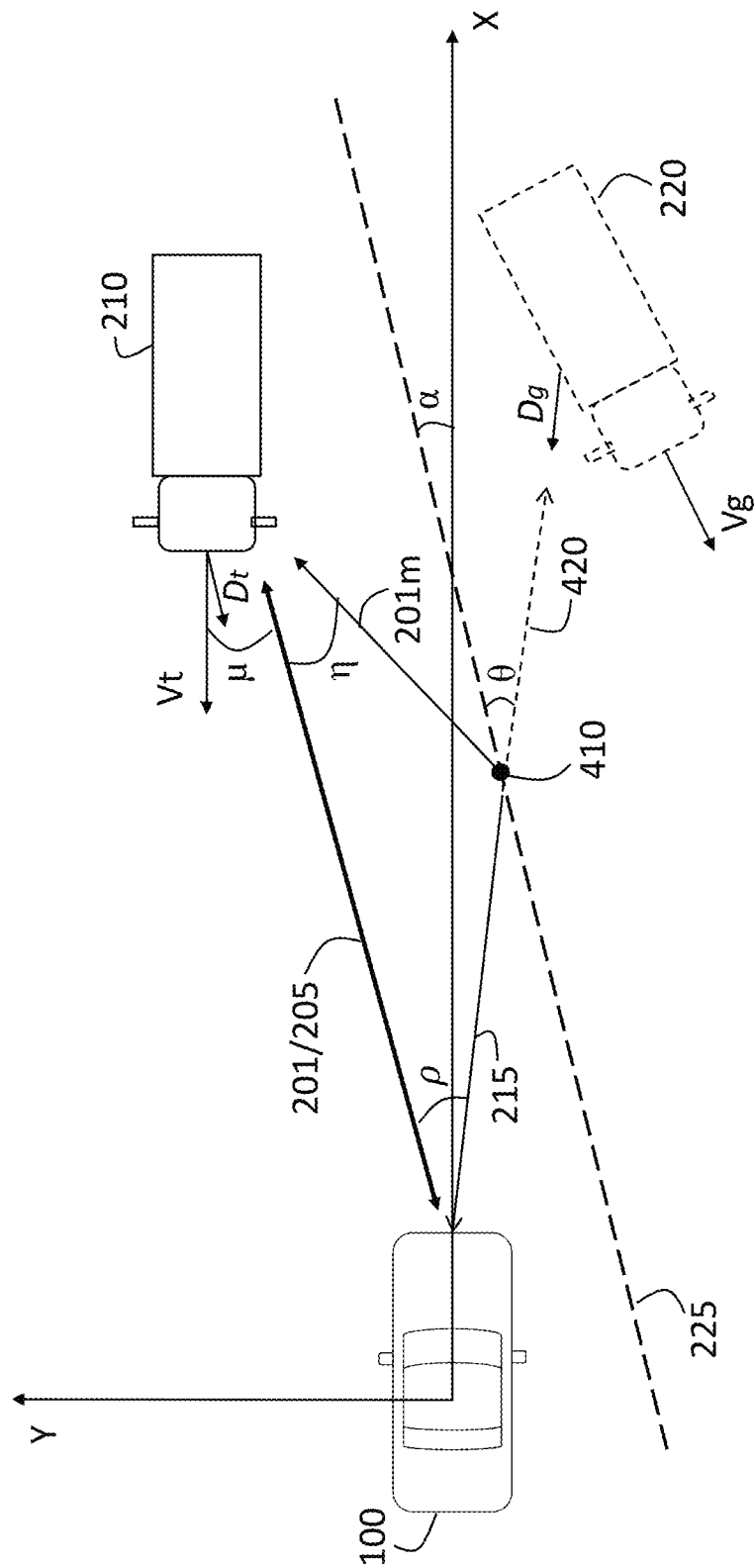
FIG. 4 illustrates an exemplary scenario requiring multipath ghost mitigation for a vehicle according to one or more embodiments.

FIG. 4 illustrates an exemplary scenario requiring multipath ghost mitigation for a vehicle 100 according to one or more embodiments. The illustration in FIG. 4, with continuing reference to FIGS. 1-3, is used to detail the criteria applied at block 340 in FIG. 3. The vehicle 100 includes the radar system 110 and controller 120 that implement the multipath ghost mitigation according to one or more embodiments. An exemplary true object 210 is shown as a truck. Transmitted energy 201 results in a direct reflection 205 from the true object 210. The ghost object 220 corresponding with the true object 210 is also shown. Transmitted energy 201m results in a multipath reflection 215 from the true object 210. The transmitted energy 201m is deflected by a reflective surface 225 at the reflection point 410 to the true object 210. This is what results in the multipath reflection 215 from the true object 210 back via the reflective surface 225 to the radar system 110 of the vehicle 100. Because of the multipath reflection 215, the detection appears to be from the location indicated for the ghost object 220. As FIG. 4 indicates, the ghost object 220 looks like a mirror image of the true object 210 with the reflective surface 225 representing the mirror surface. The ghost line 420 and the angles and other values indicated are detailed with reference to FIG. 5.

Figure 5:
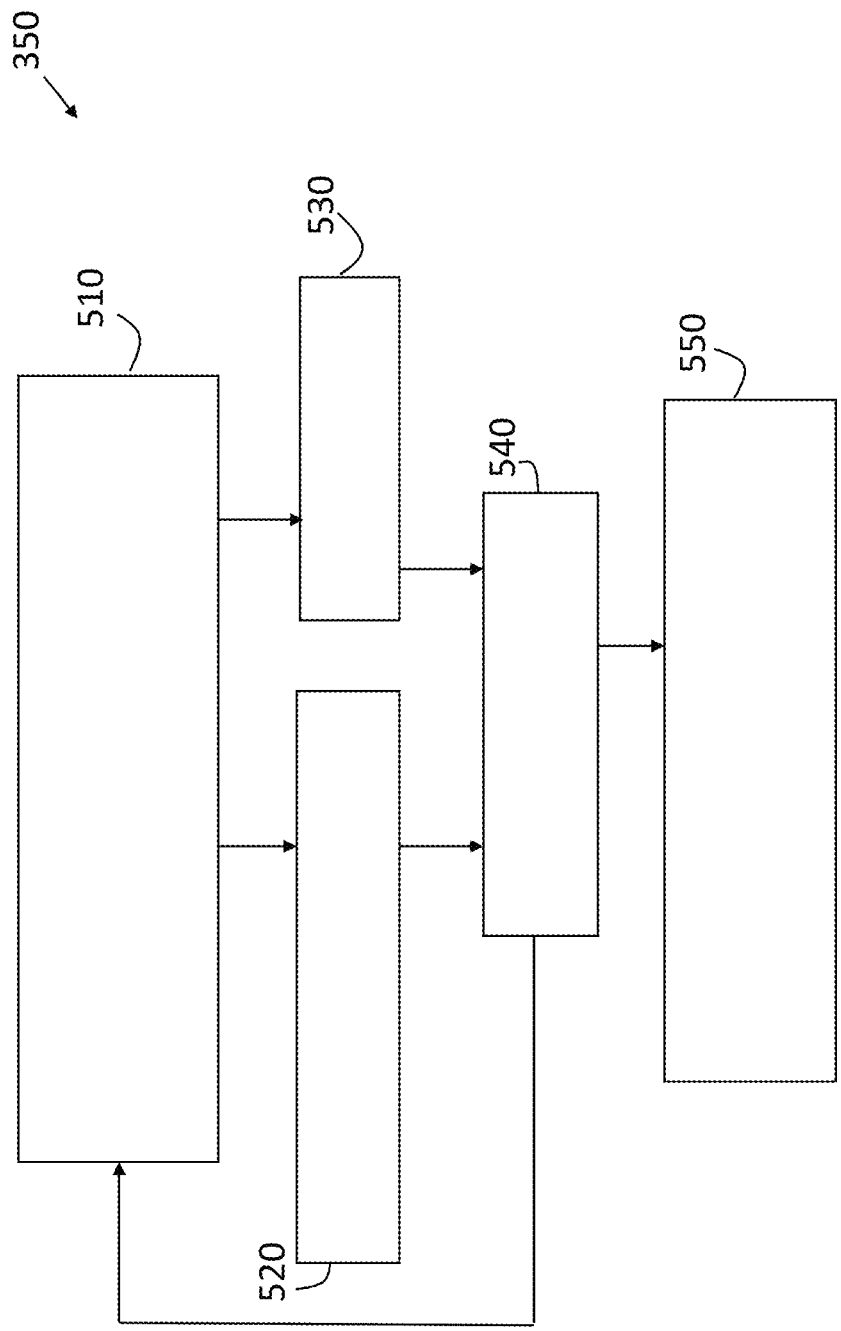
FIG. 5 is a process flow detailing tasks involved in determining the shape of the reflective surface.

FIG. 5 is a process flow detailing tasks involved in determining, at block 350 (FIG. 3), the shape of the reflective surface 225. Continuing reference is made to FIGS. 1-4. Essentially, multiple reflection points 410 are determined from the track updates made to the tracks of the candidate pair based on additional detection and processing (at block 310) of the candidate true object 210 and ghost object 220 pair. The shape suggested by the multiple reflection points 410 is tested to determine whether the reflective surface 225 is straight to a sufficient extent, thereby suggesting a real ghost object 220 in the candidate pair.

At block 510, the process includes obtaining the detected position of the candidate true object 210 ($x_t$, $y_t$) and the detected position of the candidate ghost object 220 ($x_g$, $y_g$) from the track database 305. At block 520, calculating the reflection line is based on the line equation:

$$y = \tan(\alpha)x + b \quad [EQ.\ 1]$$

In EQ. 1, the line slope, $\tan(\alpha)$, is based on the reflection surface angle $\alpha$, which is the angle between the reflective surface 225 and the direction of travel X of the vehicle 100, as shown in FIG. 4. This reflection surface angle $\alpha$ is given by:

$$\alpha = \tan^{-1}(m) - \frac{\pi}{2} \quad [EQ.\ 2]$$

In EQ. 2, m is based on the detected position of the candidate true object 210 ($x_t$, $y_t$) and the detected position of the candidate ghost object 220 ($x_g$, $y_g$) and is given by:

$$m = \frac{y_t - y_g}{x_t - x_g} \quad (EQ.\ 3)$$

The intercept, b, in the line equation shown in EQ. 1 is given by:

$$b = y_0 - \tan(\alpha)x_0 \quad [EQ.\ 4]$$

$$x_0 = \frac{x_t + x_g}{2} \quad [EQ.\ 5]$$

$$y_0 = \frac{y_t + y_g}{2} \quad [EQ.\ 6]$$

Calculating the ghost line 420, at block 530, includes using the line equation:

$$y = \tan(\beta)x \quad [EQ.\ 7]$$

The slope, $\tan(\beta)$, may be derived from the position of the candidate ghost object 220:

$$\beta = \tan^{-1} \frac{y_g}{x_g} \quad [EQ.\ 8]$$

Once the reflection line is calculated (at block 520) based on EQ. 1 and the ghost line 420 is calculated (at block 530) based on EQ. 7, the processes include obtaining the reflection point 410, at block 540. An estimate of the reflection point 410 is at position ($x_r$, $y_r$), and $x_r$ and $y_r$ are obtained as:

$$x_r = \frac{b}{\tan(\beta) - \tan(\alpha)} \quad [EQ.\ 9]$$

$$y_r = \tan(\beta)x_r \quad [EQ.\ 10]$$

The processes at blocks 510 through 540 are repeated, as indicated in FIG. 5, with each iteration using the next positions from the updated tracks of the candidate true object 210 and the candidate ghost object 220 in the track database 305. At block 550, obtaining a surface line vector ($\underline{x_r}$, $\underline{y_r}$) refers to a vector of the estimates of the reflection points 410. That is, a surface line vector ($\underline{x_r}$, $\underline{y_r}$) is a vector of the results of EQS. 9 and 10 for positions of the candidate true object 210 and the candidate ghost object 220 from the track updates. At block 550, obtaining the surface line estimate includes performing a linear fit (e.g., liner regression, ransac) on the surface line vector ($\underline{x_r}$, $\underline{y_r}$). The surface line estimate is given by ($\widehat{x_r}$, $\widehat{y_r}$). At block 550, performing criteria testing refers to three different criteria that may be tested.

At block 550, one criteria includes determining whether the mean square distance (MSD) is within a threshold value. The MSD is given by:

$$E((\widehat{x_r} - \underline{x_r})^2 + (\widehat{y_r} - \underline{y_r})^2) \quad [EQ.\ 11]$$

In EQ. 11, E indicates a mean operation. Another criteria involves determining whether the percentage of estimations that exceed a threshold are within a specified value (i.e., a specified percentile of error). Yet another criteria examines the error between the vector of reflection surface angles $\underline{\alpha}$ (results of EQ. 2 for multiple track updates) and the surface angle estimate $\hat{r}$ calculated by the linear fit. The error is given by:

$$E(\underline{\alpha} - \hat{r}) \quad [EQ.\ 12]$$

Based on the criteria, a determination is made (at block 350, FIG. 3) of whether the reflection surface 225 is sufficiently linear to suggest that the candidate pair selected at block 330 is a true object 210 and ghost object 220 pair.

The process at block 360 (FIG. 3) to determine whether the dynamics suggest that the candidate pair selected at block 330 is a true object 210 and ghost object 220 pair is detailed. Specifically, the determination at block 360 is whether the candidate true object 210 and the candidate ghost object 220 exhibit dynamics that mirror each other. The velocity $\upsilon_g$ of the ghost object 220 and the velocity $\upsilon_t$ of the true object 210 are indicated in FIG. 4. The velocity $\upsilon_g$ of the ghost object 220 is a mirror image of the velocity $\upsilon_t$ of the true object 210 such that:

$$\upsilon_g = R\upsilon_t \quad [EQ.\ 13]$$

In EQ. 13, R is the rotation matrix and is given by:

$$R = \begin{pmatrix} \cos 2\gamma & \sin 2\gamma \\ -\sin 2\gamma & \cos 2\gamma \end{pmatrix} \quad [EQ.\ 14]$$

The angle $\gamma$ is the angle difference between the vector of true object velocities $\upsilon_t$ and the reflective surface 225 and is given by:

$$\gamma = \cos^{-1} \frac{v_t}{\|v_t\|} \cdot S_r \quad [EQ.\ 15]$$

In EQ. 15, $S_r$ is a normalized vector corresponding with the reflective surface 225 and is given by:

$$S_r = (\cos \alpha, \sin \alpha) \quad [EQ.\ 16]$$

The true object Doppler $D_t$ and the ghost object Doppler $D_g$ are projections of the true object velocity $\upsilon_t$ and the ghost object velocity $\upsilon_g$, respectively, towards the vehicle 100. They are given by:

$$D_t = \frac{(x_t, y_t)}{\|(x_t, y_t)\|} \cdot v_t \qquad [EQ.\ 17]$$

$$D_g = \frac{(x_g, y_g)}{\|(x_g, y_g)\|} \cdot v_g \qquad [EQ.\ 18]$$

The Doppler values are measured (i.e., obtained from the direct reflection 205 and multipath reflection 215 as previously noted). The velocity of the candidate true object 210 ($v_t$) is estimated as:

$$v_t = (V\cos\phi, V\sin\phi) \qquad [EQ.\ 19]$$

In EQ. 19, V is the velocity of the candidate true object 210 and is given by:

$$V = \frac{D_t}{\cos\mu} \qquad [EQ.\ 20]$$

The angle $\mu$ is the angle between the heading of the true object 210 and the vehicle 100, as shown in FIG. 4, and is given by:

$$\mu = \tan^{-1}\frac{D_t\cos\eta - D_g}{D_t\sin\eta} \qquad [EQ.\ 21]$$

The angle $\eta$ is the angle between the direct reflection 205 and the multipath reflection 215, as shown in FIG. 4, and is given by:

$$\eta = 2\theta - \rho \qquad [EQ.\ 22]$$

The incident angle $\theta$ is the angle between the reflection surface 225 and the ghost line 420, as shown in FIG. 4. The angle $\rho$ is the angle between the transmitted energy 201 and the transmitted energy 201$m$ originating from the vehicle 100, as shown in FIG. 4. As previously noted, the velocity of the candidate true object 210, V, is obtained based on values associated with the candidate ghost object 220 according to EQS. 21 and 22. For a pair that is declared and classified as a real true object 210 and ghost object 220 pair, estimating the velocity of the true object 210 using values obtained with the ghost object 220, according to EQS. 21 and 22 will result in a more accurate velocity estimate.

In EQ. 19, $\phi$ is the heading of the candidate true object 210 and is given by:

$$\phi = \pi - \tan^{-1}\left(\frac{y_t}{x_t}\right) + \mu \qquad [EQ.\ 23]$$

By obtaining the velocity V of the candidate true object 210, according to EQ. 20, and the heading $\phi$ of the candidate true object 210, according to EQ. 23, for every track update of the candidate true object 210, a velocity vector $\underline{v}_t$ may be obtained. This estimated velocity vector $\underline{v}_t$ may be compared with the velocity vector $\hat{v}_t$ that is obtained from processing the direct reflections 205 and stored in the track database 305. Because the estimated velocity vector $\underline{v}_t$ is derived using the candidate ghost object 220 while the velocity vector $\hat{v}_t$ is obtained from processing the direct reflections 205, a close match between the two suggests that the candidate ghost object 220 is a real ghost object 220.

Specifically, two criteria may be checked. One criteria is the MSE between the estimated velocity vector $\underline{v}_t$ and the velocity vector $\hat{v}_t$, which is given by:

$$E((\widehat{v_{t_x}} - \underline{v}_{t_x})^2 + (\widehat{v_{t_y}} - \underline{v}_{t_y})^2) \qquad [EQ.\ 24]$$

In EQ. 24, $\underline{v}_{t_x}$ and $\underline{v}_{t_y}$ are the x and y components of the estimated velocity vector $\underline{v}_t$. A determination may be made about whether the MSE is below a threshold value. A second criteria that may be checked is whether the percentage of estimation differences between the estimated velocity vector $\underline{v}_t$ and the velocity vector $\hat{v}_t$ (i.e., the percentile error) is within a specified threshold.

The process at block 360 (FIG. 3) to determine whether the dynamics of the candidate true object 210 and the candidate ghost object 220 mirror each other can include additional criteria. The candidate pair should have the same length. Thus, a criterion may be:

$$|l(\widehat{x_t}) - l(\widehat{x_g})| \qquad [EQ.\ 25]$$

Generally, length l is defined as:

$$l(x) = \Sigma_{i=0}^{N-2}\|x_{i+1} - x_i\| \qquad [EQ.\ 26]$$

In addition, the candidate pair should have the same velocity magnitude. Thus, an MSE may be defined as:

$$E((|\widehat{v_t}| - |\widehat{v_g}|)^2) \qquad [EQ.\ 27]$$

Finally, as another check of object dynamics at block 360 (FIG. 3), the velocity heading of the candidate ghost object 220 should match the heading of the candidate true object 210 but in a mirrored fashion. Thus, the angle between velocity vector and reflective surface 225 should be the same for the candidate true object velocity vector $\hat{v}_t$ (determined and stored in the track database 305) and for the candidate ghost object velocity vector $\hat{v}_g$ (determined and stored in the track database 305). Accordingly, an MSE may be defined as:

$$E\left(\left(\cos^{-1}\frac{\widehat{v_t}}{\|\widehat{v_t}\|}\cdot S_r - \cos^{-1}\frac{\widehat{v_g}}{\|\widehat{v_g}\|}\cdot S_r\right)^2\right) \qquad [EQ.\ 28]$$

Thus, a check may be done of whether the MSE is within a threshold value.

The process at block 370 (FIG. 3) to determine whether the incident angle $\theta$ of the transmitted energy 201 suggests that the candidate pair selected at block 330 is a true object 210 and ghost object 220 pair is detailed. As previously noted, generally, a low incident angle $\theta$ suggests that the candidate pair is a true object 210 and ghost object 220 pair. This is because surface reflectivity (of the reflective surface 225) is higher at low angles. The incident angle $\theta$ determined for each track update of the candidate pair yields a vector of incident angles $\underline{\theta}$. Two criteria may be applied to this vector. First, a mean incident angle $E(\underline{\theta})$ may be checked against a threshold value. Additionally, a percentile error indicating a percentage of estimation differences that exceed a threshold value may be checked. The threshold is range dependent. This is because close multipath reflections 215 may occur at higher incident angles $\theta$ that multipath reflections 215 from a true object 210 that is farther in range from the vehicle 100.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for a radar system of a vehicle, the method comprising:
   detecting two or more objects using the radar system of the vehicle;
   initiating tracks of the two or more objects in a track database, the tracks storing data, respectively, for the two or more objects and being updated based on additional detections of the two or more objects, and the tracks of the two or more objects initially being unclassified tracks in the track database;
   selecting, using a processor, two tracks corresponding to two of the two or more objects from the track database as a candidate pair;
   applying criteria to the candidate pair, using the processor, to determine whether one track of the two tracks of the candidate pair is a track of a ghost object resulting from multipath reflection and another track of the two tracks of the candidate pair is a track of a true object corresponding with the ghost object, wherein the ghost object represents detection of the true object in an incorrect location;
   classifying, in the track database using the processor, the candidate pair as tracks of a true object and ghost object pair based on determining that the one track of the two tracks of the candidate pair is the track of the ghost object and the other track of the two tracks of the candidate pair is the track of the true object corresponding with the ghost object; and
   reporting information from the track database and, based on the classifying, the reporting includes providing the data only for the track of the true object, wherein the information is used to control an operation of the vehicle.

2. The method according to claim 1, wherein the selecting the two tracks of the candidate pair is based on a difference between a first range obtained from the one track of the two tracks of the candidate pair and a second range obtained from the other track of the two tracks of the candidate pair being within a threshold range value.

3. The method according to claim 1, further comprising iteratively selecting different candidate pairs from the track database, applying the criteria, and classifying the different candidate pairs.

4. The method according to claim 1, further comprising classifying one or both of the two tracks of the candidate pair as the track of the true object or leaving a prior classification of the two tracks of the candidate pair based on the criteria not determining that the one track of the two tracks of the candidate pair is the track of the ghost object and the other track of the two tracks of the candidate pair is the track of the true object corresponding with the ghost object.

5. The method according to claim 1, wherein the applying the criteria to the candidate pair includes applying a first criterion that includes estimating a shape of a reflective surface giving rise to the multipath reflection that would result in the one track of the two tracks of the candidate pair being the track of the ghost object.

6. The method according to claim 5, wherein the applying the first criterion includes determining that the one track of the two tracks of the candidate pair is the track of the ghost object based on a linearity of the reflective surface.

7. The method according to claim 1, wherein the applying the criteria to the candidate pair includes applying a second criterion that includes determining if dynamics indicated by the one track of the two tracks of the candidate pair matches dynamics indicated by the other track of the two tracks of the candidate pair such that velocity and heading indicated by the two tracks of the candidate pair are correlated within a threshold amount over multiple updates of the two tracks.

8. The method according to claim 7, wherein the applying the second criterion includes determining a first velocity indicated by the other track of the two tracks of the candidate pair using the one track of the two tracks of the candidate pair, determining a second velocity indicated by the other track of the two tracks of the candidate pair using the updates of the other track of the two tracks of the candidate pair, and classifying the one track of the two tracks of the candidate pair as the track of the ghost object and the other track of the two tracks of the candidate pair as the track of the true object corresponding with the ghost object based on the first velocity and the second velocity being within a specified threshold of each other.

9. The method according to claim 1, wherein the applying the criteria to the candidate pair includes determining an incident angle of transmit energy from the radar system on a reflective surface that gives rise to the multipath reflection that would result in the one track of the two tracks of the candidate pair being the track of the ghost object and determining whether the incident angle is below a threshold value, the threshold value being range-dependent.

10. The method according to claim 1, further comprising estimating a velocity of the true object based on the ghost object based on the determining that the one track of the two tracks of the candidate pair is the track of the ghost object and the other track of the two tracks of the candidate pair is the track of the true object corresponding with the ghost object.

11. A system in a vehicle, the system comprising:
    a radar system configured to detect two or more objects; and
    a processor configured to initiate tracks of the two or more objects in a track database, the tracks storing data, respectively, for the two or more objects and being updated based on additional detections of the two or more objects, and the tracks of the two or more objects initially being unclassified tracks in the track database, to select two tracks corresponding to two of the two or more objects from the track database as a candidate pair, to apply criteria to the candidate pair to determine whether one track of the two tracks of the candidate pair is a track of a ghost object resulting from multipath reflection and another track of the two tracks of the candidate pair is a track of a true object corresponding with the ghost object, wherein the ghost object represents detection of the true object in an incorrect location, to classify the candidate pair as tracks of a true object and ghost object pair based on determining that the one track of the two tracks of the candidate pair is the track of the ghost object and the other track of the two tracks of the candidate pair is the track of the true object corresponding with the ghost object, and to report information from the track database, wherein the reporting includes providing the data only for the track of the true object, not the ghost object, and the information is used to control an operation of the vehicle.

12. The system according to claim 11, wherein the processor is configured to select the two tracks of the candidate pair based on a difference between a first range obtained from the one track of the two tracks of the candidate pair and a second range obtained from to the other track of the two tracks of the candidate pair being within a threshold range value.

13. The system according to claim 11, wherein the processor is configured to iteratively select different candidate pairs from the track database, apply the criteria, and classify the different candidate pairs.

14. The system according to claim 11, wherein the processor is further configured to classify one or both of the two tracks of the candidate pair as the track of the true object or leave prior classification of the two tracks of the candidate pair based on the criteria not determining that the one track of the two tracks of the candidate pair is the track of the ghost object and the other track of the two tracks of the candidate pair is the track of the true object corresponding with the ghost object.

15. The system according to claim 11, wherein the processor is configured to apply the criteria by applying a first criterion that includes estimating a shape of a reflective surface giving rise to the multipath reflection that would result in the one track of the two tracks of the candidate pair being the track of the ghost object.

16. The system according to claim 15, wherein the processor is configured to apply the first criterion to determine that the one track of the two tracks of the candidate pair is the track of the ghost object based on a linearity of the reflective surface.

17. The system according to claim 11, wherein the processor is configured to apply the criteria by applying a second criterion that includes determining if dynamics of the one track of the two tracks of the candidate pair matches dynamics of the other track of the two tracks of the candidate pair such that velocity and heading indicated by the two tracks of the candidate pair are correlated within a threshold amount over multiple updates of the two tracks.

18. The system according to claim 17, wherein the processor is configured to apply the second criterion to determine a first velocity indicated by the other track of the two tracks of the candidate pair using the one track of the two tracks of the candidate pair, to determine a second velocity of the other track of the two tracks of the candidate pair using the updates of the other track of the two tracks of the candidate pair, and to classify the one track of the two tracks of the candidate pair as the track of the ghost object and the other track of the two tracks of the candidate pair as the track of the true object corresponding with the ghost object based on the first velocity and the second velocity being within a specified threshold of each other.

19. The system according to claim 11, wherein the processor is configured to apply the criteria to the candidate pair to determine an incident angle of transmit energy from the radar system on a reflective surface that gives rise to the multipath reflection that would result in the one track of the two tracks of the candidate pair being the track of the ghost object and to determine whether the incident angle is below a threshold value, the threshold value being range-dependent.

20. The system according to claim 11, wherein the processor is further configured to estimate a velocity of the true object based on the ghost object based on the classifying indicating that the one track of the two tracks of the candidate pair is the track of the ghost object and the other track of the two tracks of the candidate pair is the track of the true object corresponding with the ghost object.

* * * * *